(12) United States Patent
da Rosa

(10) Patent No.: US 7,290,728 B1
(45) Date of Patent: Nov. 6, 2007

(54) OSCILLATION MECHANISM FOR A SPINNING REEL

(75) Inventor: Joaquim da Rosa, Lexington, SC (US)

(73) Assignee: Shakespeare Company, LLC, Columbia, SC (US)

( * ) Notice: Subject to any disclaimer, the term of this patent is extended or adjusted under 35 U.S.C. 154(b) by 0 days.

(21) Appl. No.: 11/455,594

(22) Filed: Jun. 19, 2006

Related U.S. Application Data

(60) Provisional application No. 60/800,626, filed on May 16, 2006.

(51) Int. Cl.
*A01K 89/01* (2006.01)
(52) U.S. Cl. ................................ 242/242; 242/278
(58) Field of Classification Search ................ 242/242, 242/277, 278, 484.1
See application file for complete search history.

(56) References Cited

U.S. PATENT DOCUMENTS

| | | | |
|---|---|---|---|
| 2,687,855 A | | 8/1954 | Shakespeare et al. |
| 2,724,563 A | | 11/1955 | Shakespeare et al. |
| 3,367,597 A | * | 2/1968 | Morritt ..................... 242/242 |
| 3,948,465 A | | 4/1976 | Scusa |
| 4,191,343 A | | 3/1980 | Morishita |
| 4,196,869 A | | 4/1980 | Shepherd |
| 5,143,318 A | | 9/1992 | Tipton et al. |
| 5,167,381 A | | 12/1992 | Henriksson et al. |
| 5,350,131 A | | 9/1994 | Baumgartner et al. |
| 5,364,041 A | | 11/1994 | Hitomi |
| 5,921,489 A | | 7/1999 | Shibata |
| 6,264,125 B1 | | 7/2001 | Cockerham et al. |
| 6,655,620 B2 | * | 12/2003 | Huat .......................... 242/242 |
| 6,971,600 B2 | | 12/2005 | Cheung |
| 7,188,794 B2 | * | 3/2007 | Ban et al. ................... 242/242 |
| 7,232,086 B2 | | 6/2007 | Morise |

OTHER PUBLICATIONS

Diagram labeled "Prior Art Guide Slots" Showing Configuration of Various Guide Slots (A-F) used in Fishing Reels Prior to the Invention.

* cited by examiner

*Primary Examiner*—Emmanuel M Marcelo
(74) *Attorney, Agent, or Firm*—Nelson Mullins Riley & Scarborough LLP

(57) ABSTRACT

An oscillation mechanism for use with a spinning fishing reel includes an oscillation gear with a guide pin, rotatably supported within the reel. A slider is disposed within the reel and includes a guide slot formed therein that includes an upper portion and a lower portion. The upper portion includes a first curved portion including a concave side disposed toward a forward edge of the slider and a second curved portion including a concave side disposed toward a rearward edge of the slider. The lower portion includes a first curved portion including a concave side disposed toward the rearward edge of the slider and a second curved portion including a concave side disposed toward the forward edge of the slider. Rotation of the oscillation gear causes movement of the slider along a horizontal center axis of the guide slot.

22 Claims, 10 Drawing Sheets

| | A | B | C | D | E | F | G | H | I | J | K | L | M |
|---|---|---|---|---|---|---|---|---|---|---|---|---|---|
| | | r = 4.400 | ∅ (rad) | d∅/dt = $x_1$ = r cos∅ | -3° $y_1$ = r sin∅ | O/S Curve $x_2$ | $x_{sum}$ = | v~Δ$x_{sum}$ | $v_{new}$ | $x_2$ | $x_{new}$ | A | $A_{new}$ |
| | | ∅° | | | | | | | | | | | |
| 2nd Quadrant | 0 | 180 | 3.142 | -4.40 | 0.0000 | 0.0000 | -4.40 | (0.1379) | (0.1379) | 0.0000 | 0.0000 | | |
| | 3 | 177 | 3.089 | -4.39 | 0.2303 | -0.1439 | -4.54 | (0.1254) | (0.1254) | -0.1439 | 0.1439 | 0.0125 | 0.0125 |
| | 6 | 174 | 3.037 | -4.38 | 0.4599 | -0.2874 | -4.66 | (0.1127) | (0.1107) | -0.2874 | 0.2874 | 0.0127 | 0.0147 |
| | 9 | 171 | 2.985 | -4.35 | 0.6883 | -0.4301 | -4.78 | (0.0996) | (0.0956) | -0.4281 | 0.4281 | 0.0131 | 0.0151 |
| | 12 | 168 | 2.932 | -4.30 | 0.9148 | -0.5716 | -4.88 | (0.0822) | (0.0742) | -0.5656 | 0.5656 | 0.0173 | 0.0213 |
| | 15 | 165 | 2.880 | -4.25 | 1.1388 | -0.7076 | -4.96 | (0.0530) | (0.0410) | -0.6936 | 0.6936 | 0.0293 | 0.0333 |
| | 18 | 162 | 2.827 | -4.18 | 1.3597 | -0.8260 | -5.01 | (0.0246) | (0.0086) | -0.8000 | 0.8000 | 0.0283 | 0.0323 |
| | 21 | 159 | 2.775 | -4.11 | 1.5768 | -0.9275 | -5.04 | 0.0018 | 0.0218 | -0.8855 | 0.8855 | 0.0265 | 0.0305 |
| | 24 | 156 | 2.723 | -4.02 | 1.7896 | -1.0139 | -5.03 | 0.0267 | 0.0507 | -0.9519 | 0.9519 | 0.0248 | 0.0288 |
| | 27 | 153 | 2.670 | -3.92 | 1.9976 | -1.0864 | -5.01 | 0.0501 | 0.0781 | -1.0004 | 1.0004 | 0.0234 | 0.0274 |
| | 30 | 150 | 2.618 | -3.81 | 2.2000 | -1.1462 | -4.96 | 0.0720 | 0.1040 | -1.0322 | 1.0322 | 0.0219 | 0.0259 |
| | 33 | 147 | 2.566 | -3.69 | 2.3964 | -1.1945 | -4.88 | 0.0925 | 0.1285 | -1.0485 | 1.0485 | 0.0205 | 0.0245 |
| | 36 | 144 | 2.513 | -3.56 | 2.5863 | -1.2325 | -4.79 | 0.1116 | 0.1516 | -1.0505 | 1.0505 | 0.0191 | 0.0231 |
| | 39 | 141 | 2.461 | -3.42 | 2.7690 | -1.2612 | -4.68 | 0.1293 | 0.1733 | -1.0392 | 1.0392 | 0.0177 | 0.0217 |
| | 42 | 138 | 2.409 | -3.27 | 2.9442 | -1.2814 | -4.55 | 0.1457 | 0.1893 | -1.0154 | 1.0154 | 0.0163 | 0.0160 |
| | 45 | 135 | 2.356 | -3.11 | 3.1113 | -1.2943 | -4.41 | 0.1606 | 0.1950 | -0.9847 | 0.9847 | 0.0150 | 0.0057 |
| | 48 | 132 | 2.304 | -2.94 | 3.2698 | -1.3008 | -4.24 | 0.1742 | 0.1950 | -0.9568 | 0.9568 | 0.0136 | 0.0000 |
| | 51 | 129 | 2.251 | -2.77 | 3.4194 | -1.3018 | -4.07 | 0.1864 | 0.1950 | -0.9370 | 0.9370 | 0.0122 | 0.0000 |
| | 54 | 126 | 2.199 | -2.59 | 3.5597 | -1.2982 | -3.88 | 0.1971 | 0.1950 | -0.9247 | 0.9247 | 0.0108 | 0.0000 |
| | 57 | 123 | 2.147 | -2.40 | 3.6902 | -1.2909 | -3.69 | 0.2065 | 0.1950 | -0.9196 | 0.9196 | 0.0094 | 0.0000 |
| | 60 | 120 | 2.094 | -2.20 | 3.8105 | -1.2808 | -3.48 | 0.2145 | 0.1950 | -0.9210 | 0.9210 | 0.0080 | 0.0000 |
| | 63 | 117 | 2.042 | -2.00 | 3.9204 | -1.2687 | -3.27 | 0.2212 | 0.1950 | -0.9284 | 0.9284 | 0.0067 | 0.0000 |
| | 66 | 114 | 1.990 | -1.79 | 4.0196 | -1.2555 | -3.05 | 0.2265 | 0.1950 | -0.9413 | 0.9413 | 0.0053 | 0.0000 |
| | 69 | 111 | 1.937 | -1.58 | 4.1078 | -1.2418 | -2.82 | 0.2304 | 0.1950 | -0.9592 | 0.9592 | 0.0039 | 0.0000 |
| | 72 | 108 | 1.885 | -1.36 | 4.1846 | -1.2285 | -2.59 | 0.2324 | 0.1950 | -0.9813 | 0.9813 | 0.0020 | 0.0000 |
| | 75 | 105 | 1.833 | -1.14 | 4.2501 | -1.2170 | -2.36 | 0.2335 | 0.1950 | -1.0072 | 1.0072 | 0.0010 | 0.0000 |
| | 78 | 102 | 1.780 | -0.91 | 4.3038 | -1.2075 | -2.12 | 0.2339 | 0.1950 | -1.0362 | 1.0362 | 0.0004 | 0.0000 |
| | 81 | 99 | 1.728 | -0.69 | 4.3458 | -1.2001 | -1.89 | 0.2337 | 0.1998 | -1.0677 | 1.0677 | (0.0002) | 0.0048 |
| | 84 | 96 | 1.676 | -0.46 | 4.3759 | -1.1948 | -1.65 | 0.2328 | 0.2094 | -1.0962 | 1.0962 | (0.0009) | 0.0096 |
| | 87 | 93 | 1.623 | -0.23 | 4.3940 | -1.1916 | -1.42 | 0.2313 | 0.2238 | -1.1165 | 1.1165 | (0.0015) | 0.0144 |
| | 90 | 90 | 1.571 | 0.00 | 4.4000 | -1.1905 | -1.19 | 0.2292 | 0.2430 | -1.1230 | 1.1230 | (0.0021) | 0.0192 |

*Fig. 6A*

| A | B | C | D | E | F | G | H | I | J | K | L | M |
|---|---|---|---|---|---|---|---|---|---|---|---|---|
|  | Ø° | Ø(rad) | $x_1 = r\cos\emptyset$ | $y_1 = r\sin\emptyset$ | $x_2$ | $x_1 + x_{01}$ | $\Delta x_{sum}$ | $v_{new}$ | $x_1 + x_{new}$ | $x_{new}$ | A | $A_{new}$ |
| 90 | 90 | 1.571 | 0.00 | 4.4000 | -1.1905 | -1.19 | 0.2292 | 0.2368 | -1.1230 | 1.1230 |  | 0.0131 |
| 93 | 87 | 1.518 | 0.23 | 4.3940 | -1.1916 | -0.96 | 0.2265 | 0.2499 | -0.8862 | 1.1165 | (0.0028) | 0.0071 |
| 96 | 84 | 1.466 | 0.46 | 4.3759 | -1.1948 | -0.73 | 0.2231 | 0.2570 | -0.6363 | 1.0962 | (0.0034) | 0.0010 |
| 99 | 81 | 1.414 | 0.69 | 4.3458 | -1.2001 | -0.51 | 0.2191 | 0.2580 | -0.3794 | 1.0677 | (0.0040) | (0.0050) |
| 102 | 78 | 1.361 | 0.91 | 4.3038 | -1.2075 | -0.29 | 0.2145 | 0.2530 | -0.1214 | 1.0362 | (0.0046) | (0.0062) |
| 105 | 75 | 1.309 | 1.14 | 4.2501 | -1.2170 | -0.08 | 0.2093 | 0.2467 | 0.1316 | 1.0072 | (0.0052) | (0.0075) |
| 108 | 72 | 1.257 | 1.36 | 4.1846 | -1.2285 | 0.13 | 0.2039 | 0.2393 | 0.3784 | 0.9813 | (0.0055) | (0.0086) |
| 111 | 69 | 1.204 | 1.58 | 4.1078 | -1.2418 | 0.34 | 0.1991 | 0.2306 | 0.6177 | 0.9592 | (0.0047) | (0.0098) |
| 114 | 66 | 1.152 | 1.79 | 4.0196 | -1.2555 | 0.53 | 0.1947 | 0.2208 | 0.8483 | 0.9413 | (0.0045) | (0.0110) |
| 117 | 63 | 1.100 | 2.00 | 3.9204 | -1.2687 | 0.73 | 0.1904 | 0.2099 | 1.0691 | 0.9284 | (0.0043) | (0.0121) |
| 120 | 60 | 1.047 | 2.20 | 3.8105 | -1.2808 | 0.92 | 0.1863 | 0.1978 | 1.2790 | 0.9210 | (0.0041) | (0.0131) |
| 123 | 57 | 0.995 | 2.40 | 3.6902 | -1.2909 | 1.11 | 0.1826 | 0.1847 | 1.4769 | 0.9196 | (0.0038) | (0.0142) |
| 126 | 54 | 0.942 | 2.59 | 3.5597 | -1.2982 | 1.29 | 0.1792 | 0.1705 | 1.6615 | 0.9247 | (0.0034) | (0.0152) |
| 129 | 51 | 0.890 | 2.77 | 3.4194 | -1.3018 | 1.47 | 0.1761 | 0.1553 | 1.8320 | 0.9370 | (0.0030) | (0.0161) |
| 132 | 48 | 0.838 | 2.94 | 3.2698 | -1.3008 | 1.64 | 0.1736 | 0.1392 | 1.9874 | 0.9568 | (0.0026) | (0.0114) |
| 135 | 45 | 0.785 | 3.11 | 3.1113 | -1.2943 | 1.82 | 0.1715 | 0.1278 | 2.1266 | 0.9847 | (0.0021) | (0.0019) |
| 138 | 42 | 0.733 | 3.27 | 2.9442 | -1.2814 | 1.99 | 0.1699 | 0.1259 | 2.2544 | 1.0154 | (0.0016) | 0.0030 |
| 141 | 39 | 0.681 | 3.42 | 2.7690 | -1.2612 | 2.16 | 0.1689 | 0.1289 | 2.3803 | 1.0392 | (0.0010) | 0.0036 |
| 144 | 36 | 0.628 | 3.56 | 2.5863 | -1.2325 | 2.33 | 0.1685 | 0.1325 | 2.5091 | 1.0505 | (0.0004) | 0.0043 |
| 147 | 33 | 0.576 | 3.69 | 2.3964 | -1.1945 | 2.50 | 0.1687 | 0.1367 | 2.6416 | 1.0465 | 0.0003 | 0.0050 |
| 150 | 30 | 0.524 | 3.81 | 2.2000 | -1.1462 | 2.66 | 0.1697 | 0.1417 | 2.7783 | 1.0322 | 0.0010 | 0.0059 |
| 153 | 27 | 0.471 | 3.92 | 1.9976 | -1.0864 | 2.83 | 0.1717 | 0.1477 | 2.9201 | 1.0004 | 0.0019 | 0.0068 |
| 156 | 24 | 0.419 | 4.02 | 1.7896 | -1.0139 | 3.01 | 0.1745 | 0.1545 | 3.0677 | 0.9519 | 0.0028 | 0.0080 |
| 159 | 21 | 0.367 | 4.11 | 1.5768 | -0.9275 | 3.18 | 0.1784 | 0.1624 | 3.2222 | 0.8855 | 0.0040 | 0.0094 |
| 162 | 18 | 0.314 | 4.18 | 1.3597 | -0.8260 | 3.36 | 0.1838 | 0.1718 | 3.3846 | 0.8000 | 0.0054 | 0.0100 |
| 165 | 15 | 0.262 | 4.25 | 1.1388 | -0.7076 | 3.54 | 0.1898 | 0.1818 | 3.5564 | 0.6936 | 0.0060 | (0.0023) |
| 168 | 12 | 0.209 | 4.30 | 0.9148 | -0.5716 | 3.73 | 0.1835 | 0.1795 | 3.7382 | 0.5656 | (0.0063) | (0.0087) |
| 171 | 9 | 0.157 | 4.35 | 0.6883 | -0.4301 | 3.92 | 0.1728 | 0.1708 | 3.9177 | 0.4281 | (0.0107) | (0.0092) |
| 174 | 6 | 0.105 | 4.38 | 0.4599 | -0.2874 | 4.09 | 0.1615 | 0.1615 | 4.0885 | 0.2874 | (0.0112) | (0.0116) |
| 177 | 3 | 0.052 | 4.39 | 0.2303 | -0.1439 | 4.25 | 0.1499 | 0.1499 | 4.2501 | 0.1439 | (0.0116) |  |
| 180 | 0 | 0.000 | 4.40 | 0.0000 | 0.0000 | 4.40 |  | 0.1379 | 4.4000 | 0.0000 |  |  |
| 183 | -3 | -0.052 | 4.39 | (0.2303) |  |  |  |  | 4.5379 | (0.1439) |  |  |

1st Quadrant

*Fig. 6B*

OSCILLATION MECHANISM FOR A SPINNING REEL

PRIORITY CLAIM

This application claims the benefit of provisional application Ser. No. 60/800,626, filed May 16, 2006, which is hereby relied upon and incorporated herein by reference.

TECHNICAL FILED

The present invention relates generally to fishing reels. More particularly, the present invention relates to an oscillation mechanism for a spinning fishing reel.

BACKGROUND OF THE INVENTION

Typically, a spinning fishing reel includes a spool non-rotatably mounted to a first end of a spindle extending outwardly from a front end of the reel housing and an oscillation mechanism located in the reel housing and connected to a second end of the spindle. A rotor of a spinning assembly is rotatably mounted to the reel housing and is configured for rotation about the spool. In use, by rotating a crank handle of the fishing reel, a user simultaneously causes the spool to move fore and aft along the longitudinal axis of the spindle and the rotor of the spinning assembly to rotate about the spool such that fishing line is wound about the spool's hub.

Typically, oscillation mechanisms include an oscillation gear 1 and a slider 2 fixed to a spindle 3 of the fishing reel, as shown in FIG. 1. A pin 4 on the oscillation gear engages a slot 5 on the slider, such that rotation of the oscillation gear about its center axis causes the slider, and consequently the spindle and attached spool, to move fore and aft along the longitudinal axis of the spindle. Frequently, a straight slot 5 is provided in the slider, the slot being arranged so that it is perpendicular to the spindle. This configuration results in a velocity profile for the slider and attached spool that is sinusoidal. The velocity of the spool along the longitudinal axis of the spindle is greatest when the pin engages the upper and lower end portions of the slot and is lowest when the pin engages the middle portion of the slot (as shown in FIG. 1).

As the user rotates the crank handle of the fishing reel at a constant angular velocity, the rotor of the spinning assembly also rotates at a constant velocity about the spool. As such, fishing line is wound onto the spool by the rotor at a constant rate. However, as noted, the velocity of the spool varies continuously as it moves fore and aft along the longitudinal axis of the spindle. As a result, more fishing line accumulates on the portions of the spool that are adjacent the rotor during the low velocity motion of the spool as opposed to those portions adjacent the rotor during high velocity motion of the spool. As such, excess fishing line tends to accumulate at the extreme fore and aft portions of the hub while the central portion of the hub tends to accumulate less fishing line than is desired. Uneven winding of fishing line about the spool can result in the spool having a reduced capacity for storing fishing line, tangling of the fishing line during casting, and reduced accuracy during casting, as well as other issues.

SUMMARY OF THE INVENTION

The present invention recognizes and addresses the foregoing considerations, and others, of prior art constructions and methods.

One embodiment of the present invention provides an oscillation mechanism for use with a spinning fishing reel having a spool, a spindle and a reel housing. The oscillation mechanism includes an oscillation gear rotatably supported within the reel housing. The oscillation gear includes a guide pin extending outwardly therefrom. A slider is disposed within the reel housing, and includes a forward edge and a rearward edge. A guide slot is formed in the slider and includes an upper portion and a lower portion disposed on opposite sides of a horizontal center axis. The upper portion includes a first curved portion including a concave side disposed toward the forward edge of the slider and a second curved portion including a concave side disposed toward the rearward edge of the slider. The lower portion includes a first curved portion including a concave side disposed toward the rearward edge of the slider and a second curved portion including a concave side disposed toward the forward edge of the slider. The guide slot slidably receives the guide pin such that rotation of the oscillation gear causes movement of the slider along the horizontal center axis of the guide slot.

Another embodiment of the present invention provides an oscillation mechanism for use with a spinning fishing reel that includes a reel housing, a spindle and a spool. The oscillation mechanism includes an oscillation gear rotatably supported within the reel housing, and the oscillation gear includes a guide pin extending outwardly therefrom. A slider is disposed within the reel housing and is connected to the spool by the spindle. A guide slot is formed in the slider, the guide slot includes an upper portion and a lower portion disposed on opposite sides of a horizontal center axis of the guide slot. The guide slot slidably receives the guide pin such that rotation of the oscillation gear causes motion of the slider along the horizontal center axis. The guide slot is configured to impart a velocity profile on the slider that includes at least a first constant velocity portion when the oscillation gear rotates at a constant angular velocity.

Another embodiment of the present invention provides a method of determining the shape of a curved guide slot of a slider for a fishing reel oscillation mechanism, wherein the oscillation mechanism includes an oscillation gear with a guide pin that engages the curved guide slot. The method includes the steps of selecting a first angle increment and a second angle increment through which the oscillation gear rotates at a constant rate of angular velocity, the first and second angle increments being equal; determining, for both the first and the second angular increments, a displacement of the slider along a horizontal axis that would be caused by motion of the guide pin within a straight guide slot upon rotation of the oscillation gear, the straight guide slot being transverse to the horizontal axis and symmetric about a vertical center axis of the curved guide slot; determining a first additional value that when added to the displacement over the first angular increment equals a first total value and determining a second additional value that when added to the displacement over the second angular increment equals a second total value, wherein the first total value equals the second total value.

Other objects, features and aspects for the present invention are discussed in greater detail below. The accompanying drawings are incorporated in and constitute a part of this specification, and illustrate one or more embodiments of the invention. These drawings, together with the description, serve to explain the principles of the invention.

BRIEF DESCRIPTION OF THE DRAWINGS

A full and enabling disclosure of the present invention, including the best mode thereof, to one of ordinary skill in the art, is set forth more particularly in the remainder of this specification, including reference to the accompanying drawings, in which;

FIGS. 6A and 6B are tables of calculations as used to determine the desired shape of the guide slot of the oscillation mechanism as shown in FIGS. 2A and 2B;

Figure 1:
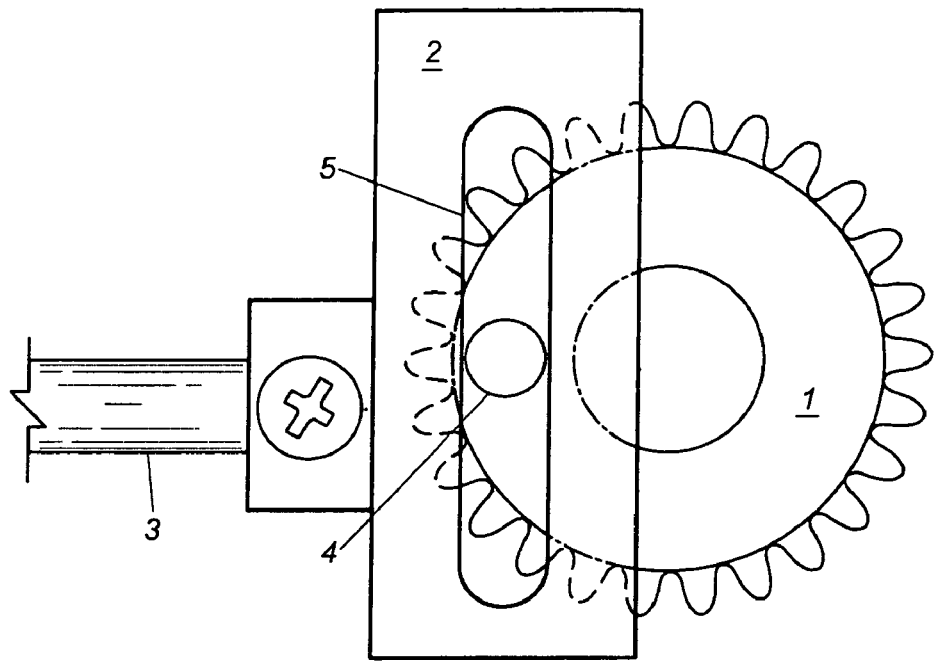
FIG. 1 is a partial left elevational view of a prior art oscillation mechanism of a spinning fishing reel.

Repeat use of reference characters in the present specification and drawings is intended to represent same or analogous features or elements of the invention.

DETAILED DESCRIPTION OF PREFERRED EMBODIMENTS

It is to be understood by one of ordinary skill in the art that the discussion herein is a description of exemplary embodiments only, and is not intended as limiting of the broader aspects of the present invention, which broader aspects are embodied in the exemplary constructions.

Figure 2A:
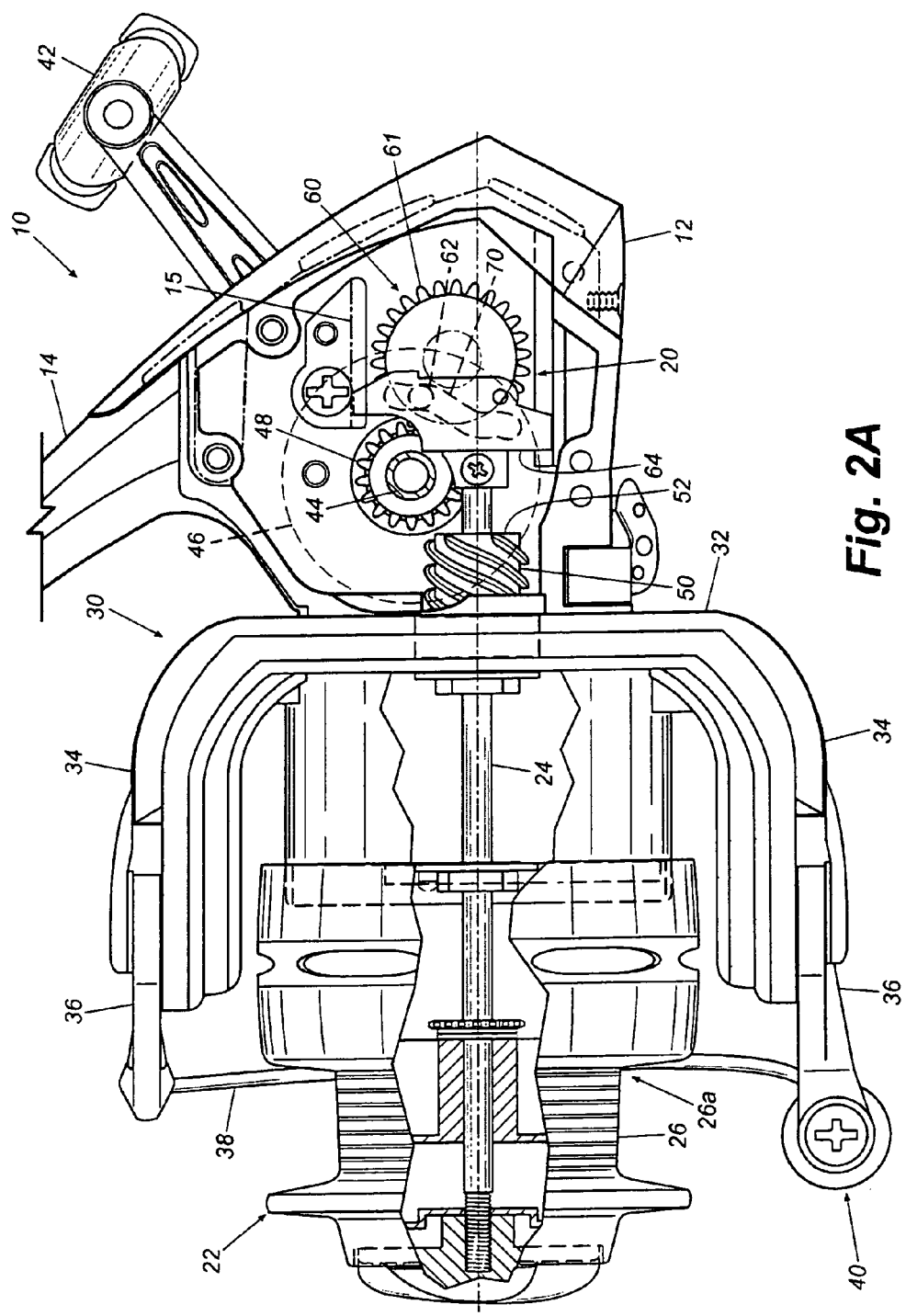
FIGS. 2A and 2B are partial cross-sectional, left elevational views of a spinning fishing reel in accordance with an embodiment of the present invention.
Figure 2B:
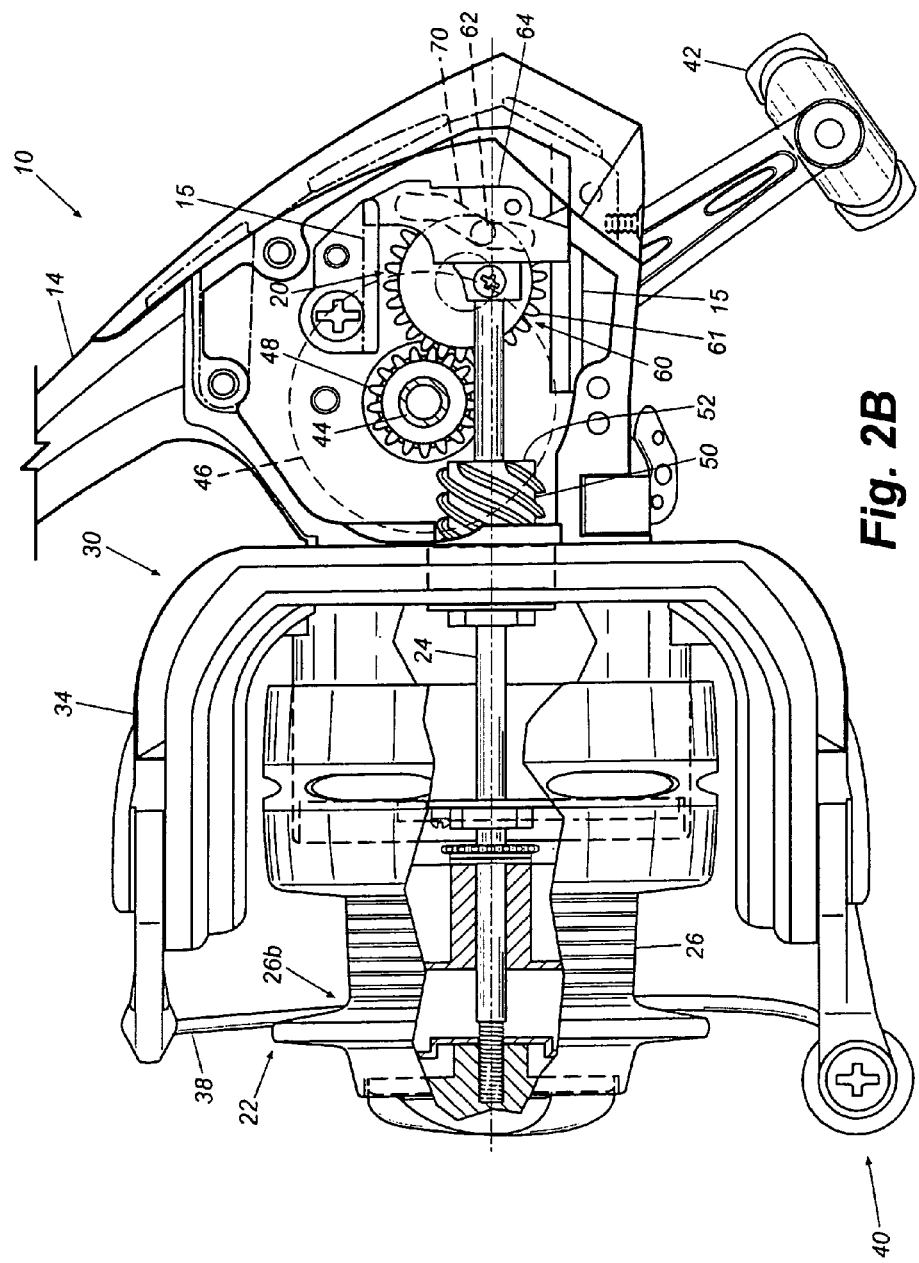

FIGS. 2A and 2B illustrate a spinning fishing reel 10 constructed in accordance with the present invention. Spinning reel 10 includes a reel housing 12, an oscillation mechanism 20, a spool 22 and a spinning assembly 30. Housing 12 encloses oscillation mechanism 20 and includes a stem 14 and mounting foot (not shown) for attaching spinning reel 10 to a fishing rod (not shown). Spool 22 is axially and non-rotatably secured to a first end of a spindle 24 extending outwardly from the front portion of reel housing 12. A second end of spindle 24 extends into reel housing 12 and is secured to the oscillation mechanism such that spindle 24, and consequently spool 22, can be moved in the fore (to the left) and aft (to the right) directions relative to the central longitudinal axis of spindle 24. Reel housing 12 rotatably supports a rotor 32 of the spinning assembly so that it is rotatable about spool 22.

A pair of bale stems 34 extend forwardly from rotor 32. A pair of bale arms 36 are pivotally secured to bale stems 34 and support a wire bale 38 therebetween. A line guide 40 is disposed on one of the bale arms and engages the fishing line (not shown) so as to distribute the fishing line along a hub 26 of the spool 22 as rotor 32 rotates about spool 22. Bale 38 is pivoted to one side of reel housing 12 during casting and returns automatically to the winding position shown when a user begins to retrieve fishing line. A crank handle 42 extends outwardly from a side of reel housing 12 and is secured to a crank shaft 44 that is non-rotatably fixed to a drive gear 46. Drive gear 46 includes a first plurality of teeth (not shown) that engages a pinion gear 50 formed on a tubular shaft 52 that rotationally drives rotor 32. A second plurality of drive teeth 48 engages an annular array of teeth 61 disposed about the outer periphery of an oscillation gear 60 of oscillation mechanism 20.

Oscillation gear 60 is rotationally supported by reel housing 12 and includes a guide pin 62 extending inwardly from an inner face of oscillation gear 60. Guide pin 62 slidably engages a guide slot 70 formed in a slider 64. Slider 64 is fixed to the second end of spindle 24 and is restrained for linear motion at its upper and lower portions by tracks 15 that are secured to the reel housing of spinning reel 10. Spindle 24 extends outwardly through tubular shaft 52 and spool 22 is attached thereto.

Figure 3:
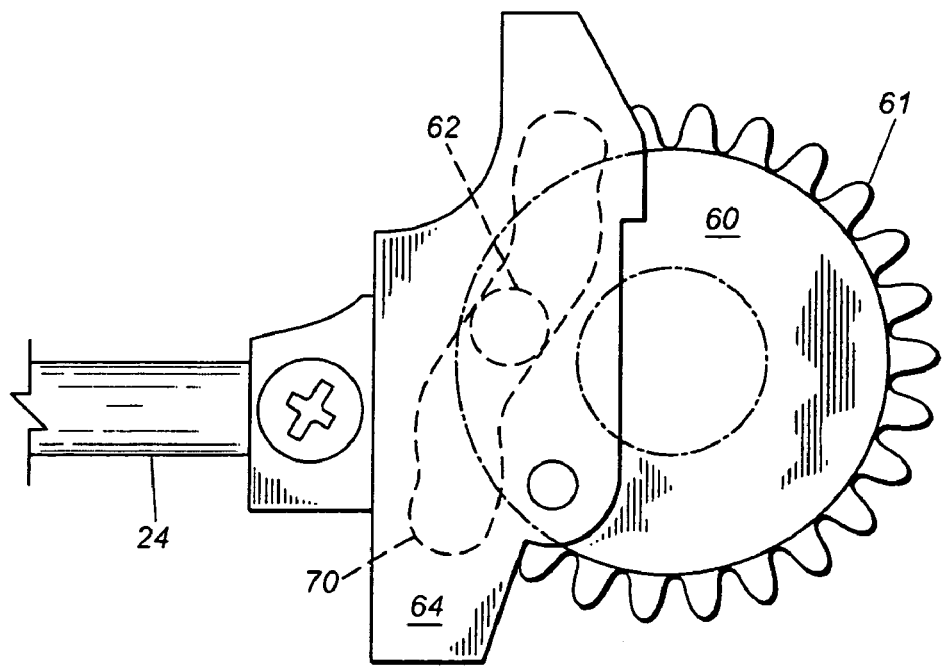
FIG. 3 is a partial left elevational view of an oscillation mechanism as shown in FIGS. 2A and 2B.
Figure 4:
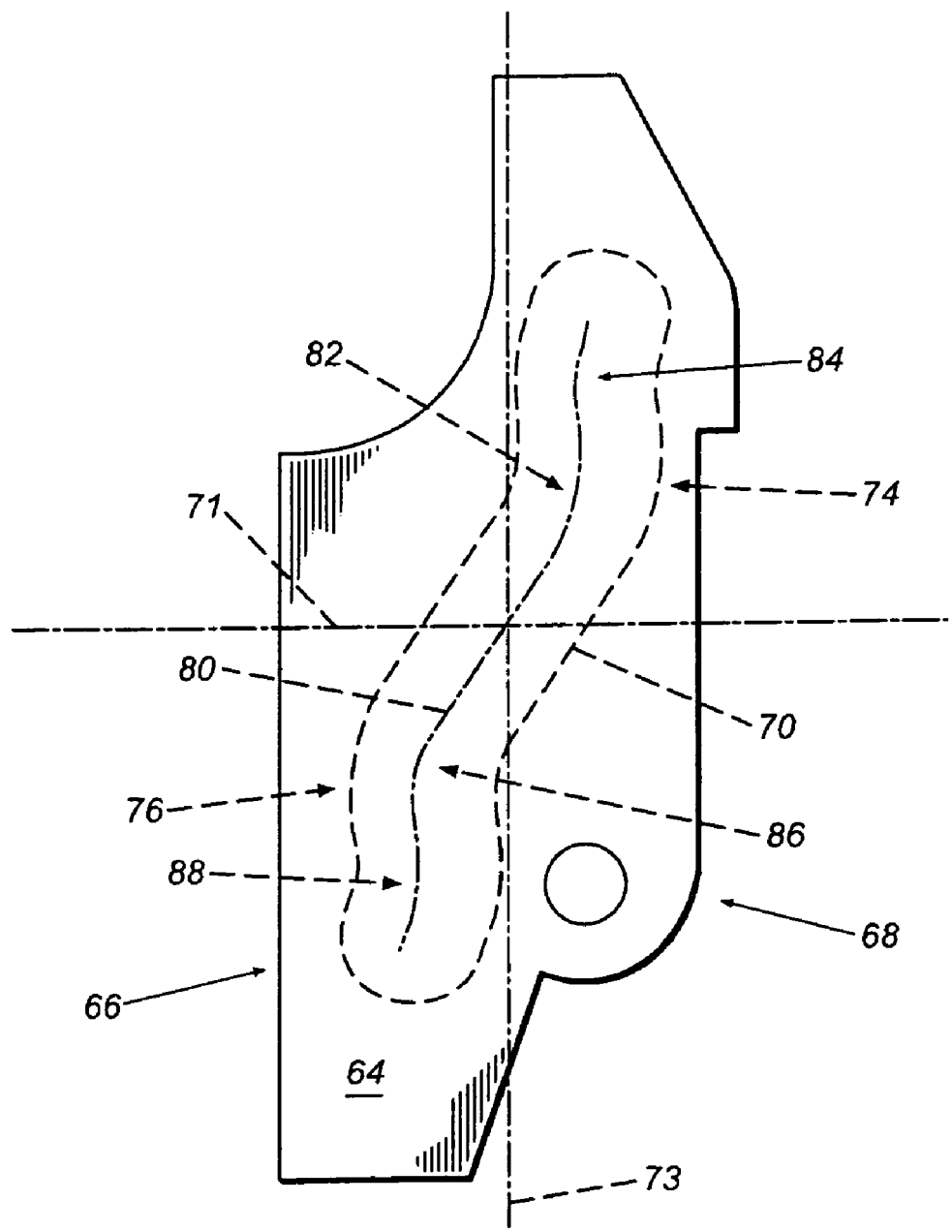
FIG. 4 is an enlarged left elevational view of a slider of the oscillation mechanism as shown in FIGS. 2A and 2B.

Referring now to FIGS. 3 and 4, in a preferred embodiment of the present invention, guide slot 70 is divided into an upper portion 74 and a lower portion 76 by a horizontal center axis 71. As shown, upper portion 74 and lower portion 76 are reverse mirror images of each other. As most easily seen by viewing a center line 80 of guide slot 70, upper portion 74 includes a first curved portion 82 that curves toward (concave side to) a leading edge 66 of slider 64 and a second curved portion 84 that curves toward (concave side to) a trailing edge 68 of slider 64. Leading edge 66 of slider 64 is disposed toward the front end of housing 12 (toward spool 22) while trailing edge 68 is disposed toward the rear end of the fishing reel. Similar to upper portion 74, lower portion 76 also includes a first curved portion 86 and a second curved portion 88. However, because upper and lower portions 74 and 76 of guide slot 70 are reverse mirror images of each other, first curved portion 86 curves toward trailing edge 68 of slider 64 while second curved portion 88 curves toward leading edge 66 of slider 64. Note, second curved portions 84 and 88 are farther from horizontal center axis 71 than are first curved portions 82 and 86. Embodiments are also envisioned wherein upper and lower portions 74 and 76 of guide slot 70 are not reverse mirror images of each other. As such, in those embodiments, the upper and lower portions of the guide slot would impose different velocity profiles on the slider.

Determining the desired shape of a guide slot 70 in accordance with a preferred embodiment of the present invention is now discussed. As previously noted, prior art oscillation mechanisms, as shown in FIG. 1, often include a straight guide slot design that can lead to lower than desired velocities at the ends of the oscillation stroke and greater than desired velocities in the middle of the oscillation stroke. As such, when retrieving fishing line with a mechanism including a straight guide slot, the line tends to accumulate less in the middle of the spool's hub and more towards its ends. Accordingly, it is often preferable to modify the shape of the straight guide slot in order to compensate for the velocities.

Figure 9:
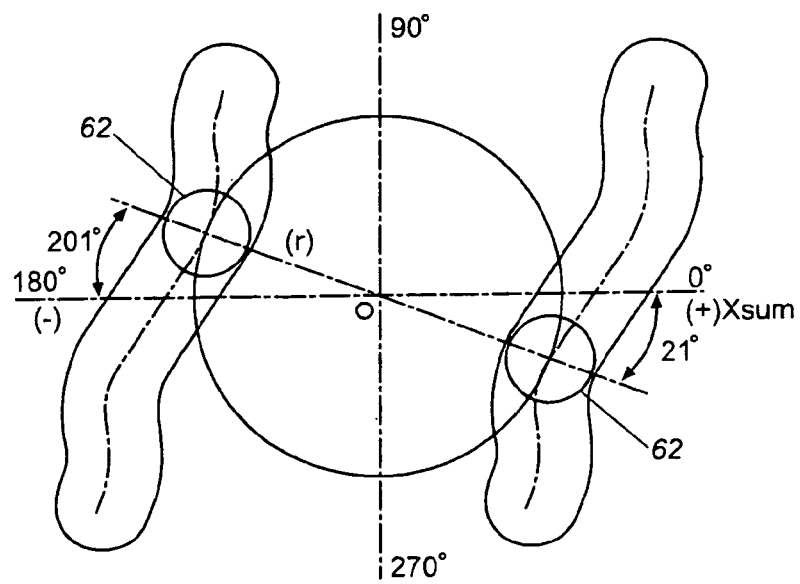
FIG. 9 is a diagram of the guide slot of the oscillation mechanism as shown in FIGS. 2A and 2B illustrating the position of the guide slot relative to the oscillation gear when the slider of the oscillation mechanism is in its extreme fore and aft positions.

For ease of description, displacement of the slider (and therefore guide slot 70) in the x-direction is synonymous with motion along the longitudinal axis of the spindle, as shown in FIGS. 2A and 2B, with negative values of displacement being to the left of the center of the oscillation stroke and positive values being to the right. The displacement in the x-direction of a slider with a straight guide slot can be calculated using the equation:

$$X_1 = r(\cos \theta) \tag{1}$$

where (r) is the distance from the center axis of the oscillation gear 1 to the center axis of the guide pin 4 and (θ) is the angle of rotation as measured from the x-axis in a clockwise direction to a line intersecting both the center axis of the oscillation gear and the center axis of the guide pin, as shown in FIG. 9. Because a guide slot 70 of the present invention deviates from the straight slot, an additional displacement of $X_2$ in the x-direction is imposed on the slider. Therefore, the total displacement of the slider in the x-direction is determined using the equation:

$$X_{sum}=X_1+X_2. \quad (2)$$

Assuming a constant input angular velocity, a constant linear velocity of the slider over a portion of its oscillatory motion can be achieved by properly selecting values of $(X_2)$. Those values of $(X_2)$ are then used to determine the shape of the guide slot in accordance with the present invention. The desired values of $(X_2)$ are found by assigning a constant linear velocity to a potion of the slot, as discussed in greater detail below. Constant linear velocity means a constant change of the distance traveled by the slider per unit of angular velocity, which is constant, will occur. Therefore, the distance traveled by the slider per unit of angular velocity is determined by the equations:

$$V=X_{sum2}-X_{sum1} \quad (3)$$

$$V=(X_{12}+X_{22})-(X_{11}+X_{21}) \quad (4)$$

and $$X_{22}=X_{11}+X_{21}-X_{12}+V \quad (5)$$

wherein (V) is the linear velocity of the slider. Note, the values of $(X_{11})$ and $(X_{12})$ are known quantities based on Equation (1), and the value of (V) is also known since it has been assigned. In short, as the oscillation gear is rotated at a constant angular velocity, each subsequent value of $(X_2)$ can be determined as long as the preceding value of $(X_2)$ is known.

Referring now to FIGS. 6A and 6B, specific examples of the above method are applied to determine the shape of a guide slot in accordance with the present invention. In the present example, the value of (r)=4.400 cm and values of $(X_2)$ are determined in 3° increments (Column A) of the angle of rotation (θ) (Column B) of the oscillation gear in the clockwise direction. For ease of description, and as shown in FIG. 9, a phase shift of 180° is applied to the angle of rotation (θ). Meaning, calculations used to determine the shape of the guide slot begin with an angle of rotation of 180°.

In a first method of determining the shape of a guide slot of the present invention, the shape is determined by modifying a straight guide slot. First, values for $(X_1)$ are calculated using Equation (1) for each 3° increment of rotation, and recorded in Column D. Next, the linear velocity (V) of the slider over each 3° increment is determined using Equations (2) through (4). Note, because we are starting with a straight slot design, there is no additional displacement component $(X_2)$ of the slider to take into account. Simply put, for the present example, $(X_{sum})$ is equal to the corresponding value of $(X_1)$ and the linear velocity (V) for each 3° increment is determined by subtracting the preceding value for $(X_1)$ from the subsequent value for $(X_1)$. Therefore, Equation (4) can be simplified to be:

$$V=X_{12}-X_{11}. \quad (6)$$

Note, FIG. 6A does not include a column for this calculation.

Figure 5:
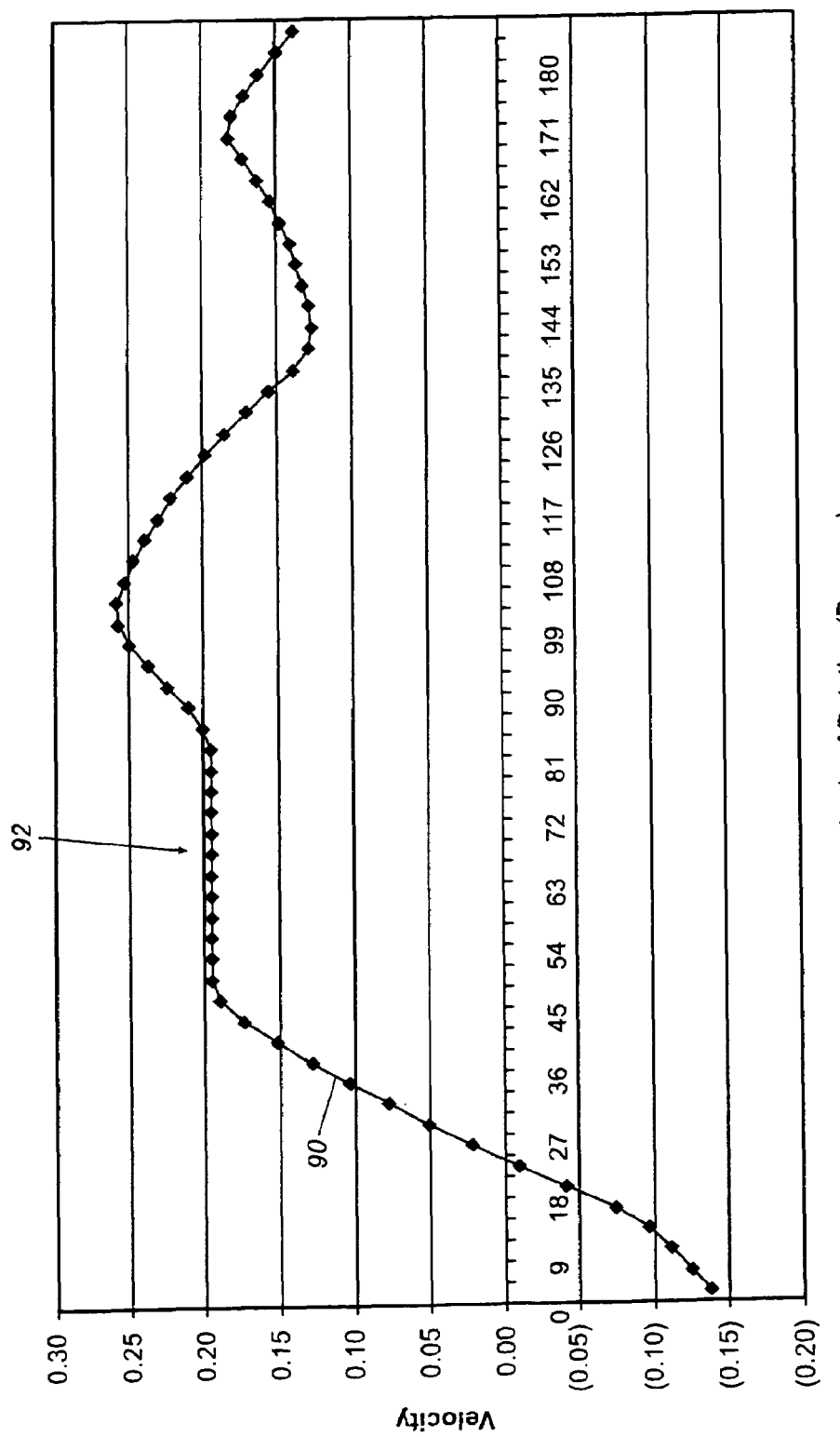
FIG. 5 is a graph of a velocity profile for the oscillation mechanism as shown in FIGS. 2A and 2B.

As previously noted, a plot of linear velocity (V) versus the angle of rotation (θ) for a straight slot design provides a sinusoidal velocity profile. Next, the sinusoidal velocity profile (not shown) is manipulated by assigning new linear velocities $(V_{new})$ Column I for each 3° increment of rotation. In the example shown in FIG. 5, the new values of the velocities $(V_{new})$ selected preferably include increased velocity values as the slider approaches the end portions of the oscillation stroke (0° and 180°) and an area of constant linear velocity (from approximately 45° to 78°, or approximately 15% of the velocity profile) therebetween. Note, for the graph in FIG. 5, the 180° phase shift has been removed. As such, the constant velocity portion of the velocity profile from approximately 45° to approximately 78° corresponds to an actual angle of rotation (Column B) of 135° to 102°. In the present example, a rate of velocity of 0.1950 cm per 3° increment was selected as the value for the constant velocity portion of the velocity profile. Note, the velocity values shown in parentheses in FIGS. 6A and 6B are negative values.

Figure 8:
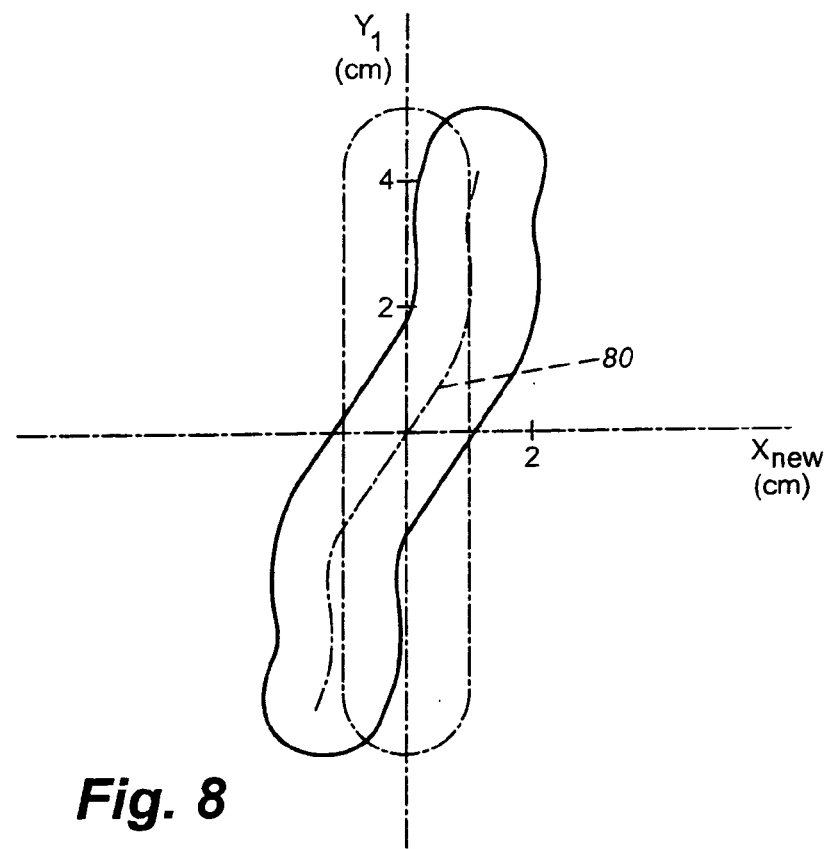
FIG. 8 is a diagram of the guide slot of the oscillation mechanism as shown in FIGS. 2A and 2B.

After the desired linear velocities $(V_{new})$ are selected, Equation (5) is used to "work backwards" and determine the values of $(X_2)$ that are then used to modify the straight guide slot and determine the shape of the guide slot according to the present invention. When determining the values of $(X_2)$, because the preferred slot includes upper and lower halves 74 and 76 (FIG. 4) that are reverse-mirror images of each other, it is only necessary to determine values for $(X_2)$ over the angle of rotation from 0° to 90°. Also, the determination of the values of $(X_2)$ begins at the center of the guide slot, at which location the value of $(X_2)$ is zero. As such, the only unknown value in Equation (5) is $(X_{22})$ since the values of $(X_{11})$ and $(X_{12})$ are known from Column D, $(V_{new})$ is known from Column I and $(X_{21})$ equals zero. Each subsequent value of $(X_2)$ is then determined by repeating the calculation and using the previously determined value of $(X_2)$. Note, the negative values listed in Column J for $(X_2)$ indicate that the additional motion imposed on the slider due to the new guide slot is to the left. As best seen in FIGS. 8 and 9, this means that for the configuration shown, the new guide slot will be displaced to the right of the straight slot in the upper half. As such, the calculated values of $(X_2)$ are made positive and listed in Column K as $(X_{new})$.

Figure 7:
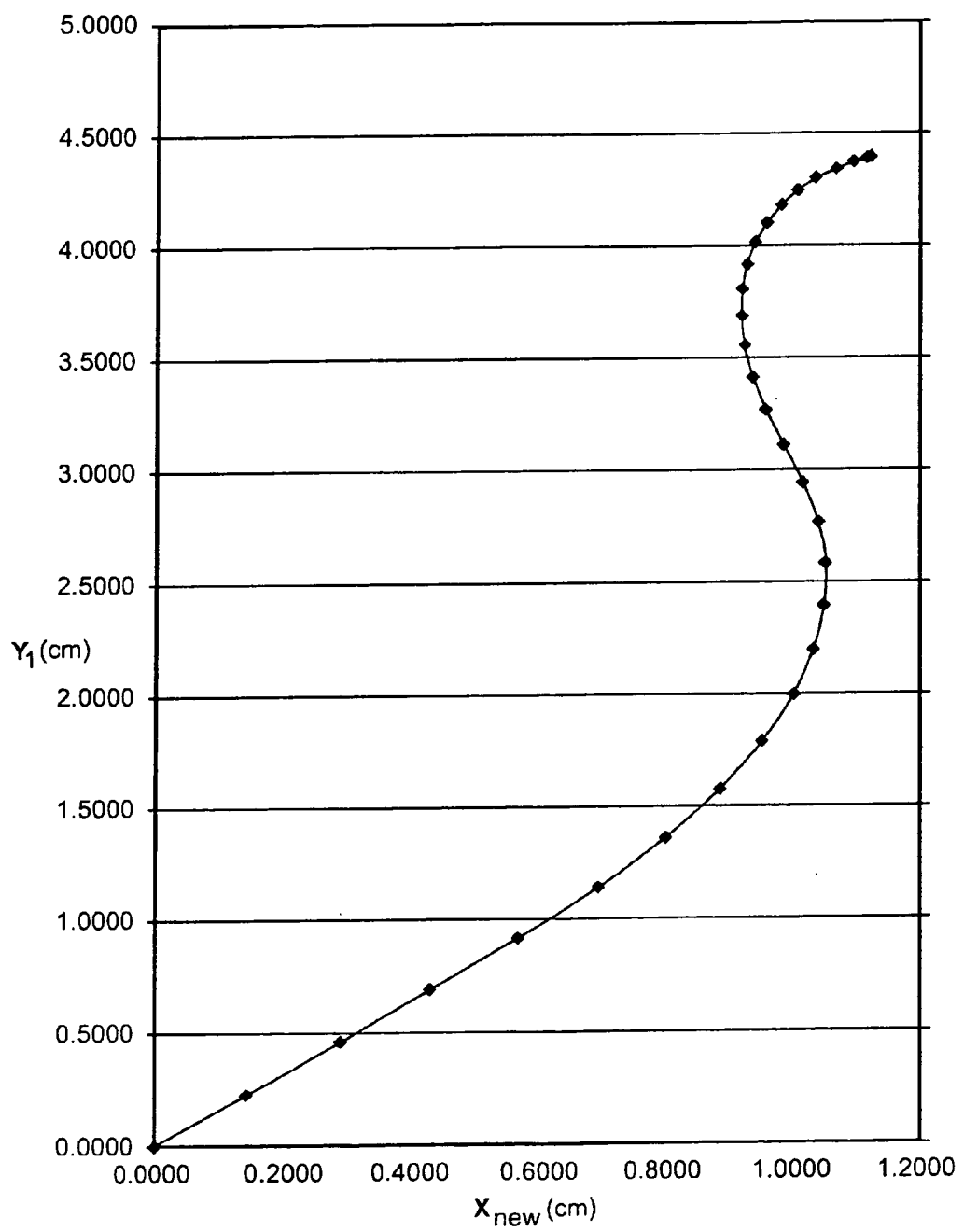
FIG. 7 is a plot of the dimensions of an exemplary guide slot of the oscillation mechanism as shown in FIGS. 2A and 2B.

Referring now to FIG. 7, a plot of the guide slot's shape (for upper portion 74) is constructed. Each value of $(X_{new})$ has a corresponding value of $(Y_1)$ as determined by the equation:

$$Y_1=(r)\sin \theta. \quad (7)$$

Note, the plot of $(X_{new})$ versus $(Y_1)$ shown in FIG. 7 is not to scale, but instead exaggerates the dimensions of the guide slot along the x-axis. A scaled plot of centerline 80 of the guide slot according to the present invention is shown in FIG. 8.

In addition to modifying a straight guide slot, a previously modified slot (not shown) can be further modified using methods similar to those noted above. Referring again to FIGS. 6A and 6B, calculations are made for each 3° increment (Column A) of the angle of rotation (θ) (Column B), with a phase shift of 180° applied, where the value of (r)=4.400 cm. As before, the calculations used to determine the shape of the guide slot begin with an initial value of 180° for the angle of rotation. Equation (1) is used to determine the values of $(X_1)$ which are provided in Column D. Unlike the previously described example, there are values for $(X_2)$ since the guide slot being modified already deviates from a straight slot design. The values of $(X_2)$ can be determined by direct measurement of the initial guide slot, and are listed in Column F. Note, for a counterclockwise rotation, when the slot deviates to the right of the vertical axis in the upper portion of the guide slot, the additional displacement of the slider will be to the left. As such, those values are listed as negative values.

Figure 10:
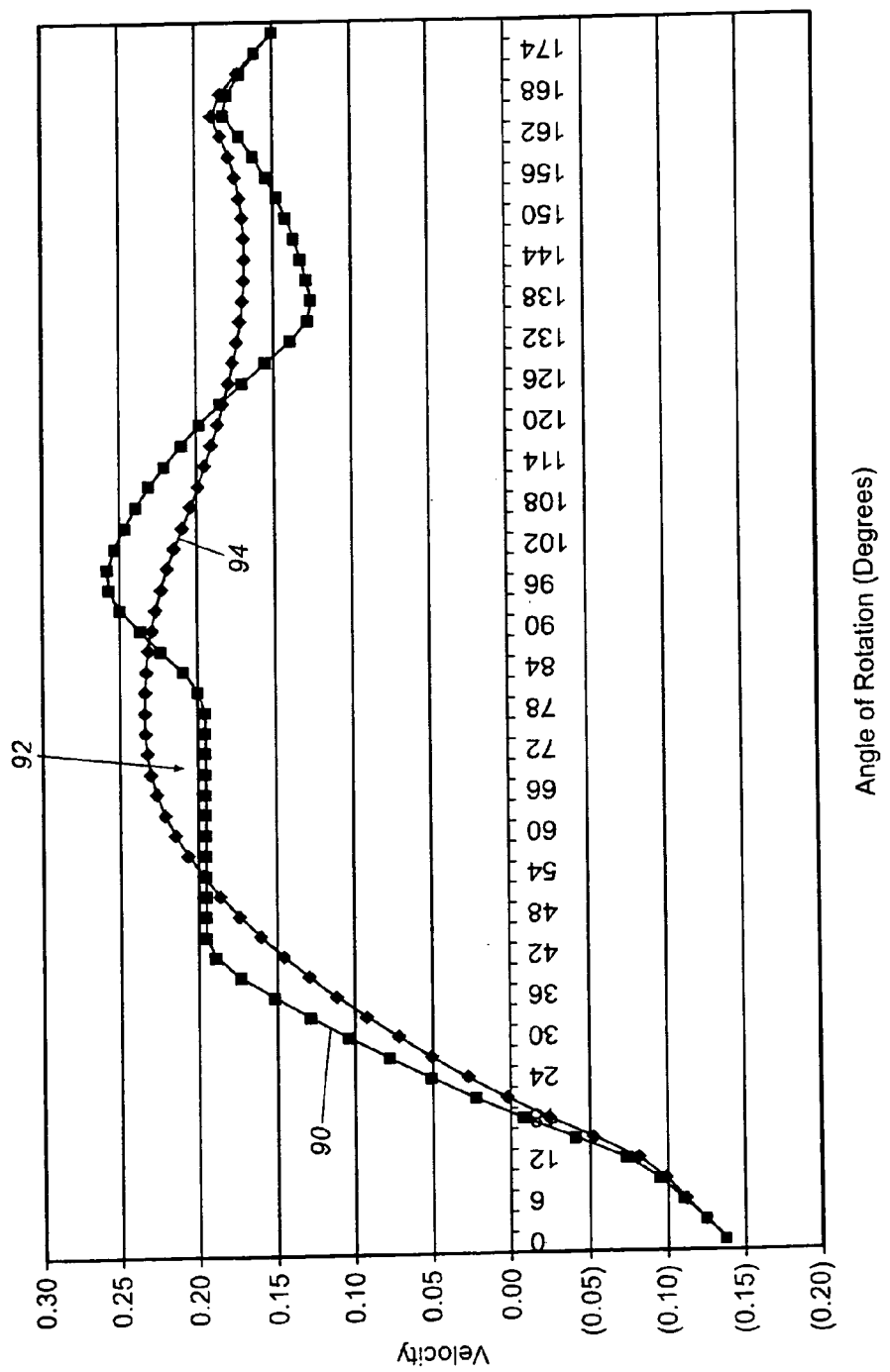
FIG. 10 is a graph of a velocity profile of a prior art oscillation mechanism in comparison with a velocity profile for the oscillation mechanism as shown in FIGS. 2A and 2B.

Next, Equation (2) is used to calculate the values of ($X_{sum}$) for the initial guide slot and are recorded in Column G. The values of the linear velocity for each 3° increment are then calculated using Equation (3) and recorded in Column H, with negative values being enclosed in parentheses. Referring now to FIG. 10, a velocity profile 94 of the initial guide slot is plotted using the linear velocity values listed in Column H. Note, the initial guide slot does not provide a range of constant linear velocity for the slider. As in the graph of FIG. 5, the 180° phase shift has been removed from the graph of FIG. 10.

Often, the velocity profile 94 of the initial guide slot is useful in determining how to modify the initial guide slot. For example, the velocity profile 94 of the initial guide slot may help determine where a constant linear velocity portion of the new velocity profile can be established without adversely affecting the rest of the profile. In the present example, the determination is made that a constant linear velocity ($V_{new}$) of 0.1950 cm per 3° increment is desirable over the range of the angle of rotation (θ) (Column B) from approximately 135° to approximately 102° (or 45° to 78° as shown in FIG. 10). Next, the remaining portions of the new velocity profile 90 between 180° and 90° (0° to 90° in FIG. 10) are approximated so that the remaining values of ($V_{new}$) can be determined.

As in the earlier example, after the values of ($V_{new}$) are determined, Equation (5) is used to "work backwards" to determine the values of ($X_2$) that determine the shape of the new guide slot. For the sake of clarity, values of ($X_2$) for the new guide slot are now referred to as ($X_{new}$). As before, when determining the values of ($X_{new}$), because the preferred slot includes upper and lower halves 74 and 76 (FIG. 4) that are reverse-mirror images of each other, it is only necessary to determine values for ($X_{new}$) over the angle of rotation from 0° to 90°. Also, as before, the determination of the values of ($X_{new}$) begins at the center of the guide slot, wherein the value of ($X_{new}$) is zero. As such, the only unknown value in Equation (5) is ($X_{22}$, now $X_{new2}$) since the values of ($X_{11}$) and ($X_{12}$) are known from Column D, ($V_{new}$) is known from Column I and ($X_{21}$, now $X_{new1}$) equals zero. Each subsequent value of ($X_{new}$) is determined by repeating the calculation and using the previous value of ($X_{new}$) to find the next one. As previously noted, additional displacement of the slider to the left (as viewed in FIGS. 2A and 2B) is indicated by the negative values of ($X_{new}$).

FIGS. 7 and 8 are similarly applicable in the presently discussed method as in the last, and are therefore not further addressed.

Additionally, the present invention includes methods of determining the shape of a guide slot using values of the linear acceleration (A) of the slider. Constant linear velocity (V) of the slider requires that the slider experience linear acceleration equal to zero. Assuming a constant input angular velocity, the linear acceleration of the slider in the x-direction is calculated using the equation:

$$A = V_2 - V_1 \quad (8)$$

wherein the values of $V_2$, $V_1$, and subsequent values of V, are determined as discussed in the previous examples and are listed in Column H of FIGS. 6A and 6B. The values of linear acceleration (A) are recorded in Column L.

Once the linear acceleration (A) values are known, the portion of velocity profile over which zero linear acceleration, and consequently constant linear velocity, is desirable can be determined. In the present example, the determination is made that zero linear acceleration ($A_{new}$=0) is desirable over the range of the angle of rotation (θ) (Column B) from approximately 132° to approximately 102°. The remaining values of linear velocity ($A_{new}$) between 180° and 90° are approximated.

After the values of ($A_{new}$) are determined, Equation (8) is used to "work backwards" to determine the values of linear velocity ($V_{new}$) recorded in Column K. In the same manner as the earlier examples, Equation (5) and the values of ($V_{new}$) are then used to determine the values of ($X_2$) that determine the shape of the new guide slot.

In any of the noted embodiments, values of ($A_{new}$) can be monitored to help ensure that the calculated values of ($X_2$) used to determine the shape of the guide slot do not cause large fluctuations or changes in the linear acceleration of the slider. As seen by equation:

$$F = mA \quad (9)$$

wherein (F) is the resistance force to rotation, when (F) is fairly constant the reel is less likely to have a "stop and go" feel, or tight spots, during winding operations. As such, large fluctuations in ($A_{new}$) are generally avoided.

OPERATION

Referring back to FIGS. 2A and 2B, operation of spinning fishing reel 10 is described. To retrieve fishing line (not shown) with spinning reel 10, a user rotates crank handle 42 in a counterclockwise direction. As shown in FIG. 2A, spool 22 is in its outermost position relative to housing 12, meaning that the fishing line is wound about an extreme right (back) portion 26a of hub 26 as winding commences. As crank handle 42 is wound in the counterclockwise direction, drive gear 46 is similarly driven in the counterclockwise direction by crankshaft 44. As drive gear 46 rotates, the first plurality of teeth (not shown) engage pinion gear 50, thereby causing rotor 32 to rotate about both housing 12 and spool 22. Line guide 40 engages the fishing line during rotation of rotor 32 so that the fishing line is laid on spool 22 in a controlled fashion.

Simultaneously, rotation of drive gear 46 also causes drive teeth 48 to engage the annular array of teeth on oscillation gear 60. As such, oscillation gear 60 is rotated in a clockwise direction. Rotation of oscillation gear 60 causes guide pin 62 to move upwardly within guide slot 70. As noted, prior to turning crank handle 42, spool 22 is already in its forward-most position relative to reel housing 12. Therefore, engagement of guide pin 62 with guide slot 70 causes slider 64 to be urged toward the right. Since spool 22 is fixed with respect to slider 64 by spindle 24, movement of slider 64 results in spool 22 also moving to the right. As spool 22 moves to the right, rotor 32 is continuously rotated about spool 22 such that the fishing line is laid across hub 26 from the extreme right portion 26a to the extreme left portion 26b. As shown, slider 64 is constrained by tracks 15 at its upper and lower ends such that slider 64 is limited to fore and aft linear motion.

As shown in FIG. 2B, spool 22 is in its fully retracted position relative to reel housing 12. Therefore, fishing line is wound on the extreme left (forward) portion 26b of hub 26 as rotor 32 continues to be rotated about spool 22. Continued counterclockwise rotation of crank handle 42 results in the travel of spool 22, as described above, being repeated between the reversal positions of the oscillatory motion continuously. As best seen in FIG. 9, for the present embodiment, the oscillatory motion of spool 22 reverses at angles of rotation equal to approximately 21° and 201°.

One skilled in the art will appreciate that terms such as right, left, forward, rear, horizontal and vertical as used in the present specification and claims indicate relative positions and are not otherwise limitative. While preferred embodiments of the invention have been shown and described, modifications and variations thereto may be practiced by those of ordinary skill in the art without departing from the spirit and scope of the present invention, which is more particularly set forth in the appended claims. In addition, it should be understood the aspects of the various embodiments may be interchanged both in or in part without departing from the scope of the present invention. Furthermore, those of ordinary skill in the art will appreciate that the foregoing description is by way of example only, and is not intended to limit the invention as further described in such appended claims.

I claim:

1. An oscillation mechanism for use with a spinning fishing reel having a spool, a spindle and a reel housing, comprising:
   an oscillation gear rotatably supported within the reel housing, said oscillation gear including a guide pin;
   a slider disposed within the reel housing, said slider having a forward edge and a rearward edge; and
   a guide slot formed in said slider, said guide slot including an upper portion and a lower portion disposed on opposite sides of a horizontal center axis,
      said upper portion including a first curved portion including a concave side disposed toward said forward edge of said slider and a second curved portion including a concave side disposed toward said rearward edge of said slider,
      said lower portion including a first curved portion including a concave side disposed toward said rearward edge of said slider and a second curved portion including a concave side disposed toward said forward edge of said slider;
   wherein said guide slot slidably receives said guide pin such that rotation of said oscillation gear causes movement of said slider along said horizontal center axis of said guide slot.

2. The oscillation mechanism of claim 1, wherein said upper and said lower portions of said guide slot are reverse mirror images of each other across said horizontal center axis.

3. The oscillation mechanism of claim 1, wherein said second curved portions of said upper and said lower portions of said guide slot are farther from said horizontal center axis than are said first curved portions of said upper and said lower portions of said guide slot.

4. The oscillation mechanism of claim 1, wherein said upper portion of said guide slot is configured to impart a velocity profile on said guide slot, said velocity profile including a constant velocity portion.

5. The oscillation mechanism of claim 4, wherein said lower portion of said guide slot is configured to impart a velocity profile on said guide slot, said velocity profile including a constant velocity portion.

6. The oscillation mechanism of claim 5, wherein said velocity profiles of said upper and said lower portion of said guide slot are identically shaped.

7. The oscillation mechanism of claim 4, wherein said constant velocity portion of said velocity profile constitutes at least approximately 15 percent of said velocity profile.

8. The oscillation mechanism of claim 1, wherein said forward edge of said slider is disposed toward a front of the reel housing and the rearward edge of the slider is disposed toward a rear of said reel housing.

9. The oscillation mechanism of claim 1, wherein the spindle includes a first end fixed to said slider and a second end fixed to the spool, the spool being disposed about a front of the reel housing.

10. An oscillation mechanism for use within a spinning fishing reel, including a reel housing, a spindle and a spool, comprising:
    an oscillation gear rotatably supported within the reel housing, said oscillation gear including a guide pin;
    a slider disposed within the reel housing, said slider being connected to the spool by the spindle; and
    a guide slot formed in said slider, said guide slot including an upper portion and a lower portion disposed on opposite sides of a horizontal center axis of said guide slot;
    wherein said guide slot slidably receives said guide pin such that rotation of said oscillation gear causes motion of said slider along said horizontal center axis, and said guide slot is configured to impart a velocity profile on said slider, said velocity profile including at least a first constant velocity portion when said oscillation gear rotates at a constant angular velocity.

11. The oscillation mechanism of claim 10, wherein said first constant velocity portion of said velocity profile is included in a first portion of said velocity profile corresponding to said upper portion of said guide slot.

12. The oscillation mechanism of claim 10, wherein said velocity profile further includes a second constant velocity portion included in a second portion of said velocity profile corresponding to said lower portion of said guide slot.

13. The oscillation mechanism of claim 12, wherein said first portion and said second portion of said velocity profile are reverse mirror images of each other.

14. The oscillation mechanism of claim 10, wherein said upper portion of said guide slot includes a first curved portion including a concave side disposed toward the spool and a second curved portion including a concave side disposed toward a rear of the reel housing.

15. The oscillation mechanism of claim 14, wherein said lower portion of said guide slot includes a first curved portion including a concave side disposed toward the rear of the reel housing and a second curved portion including a concave side disposed toward the spool.

16. The oscillation mechanism of claim 10, wherein each of said upper and lower portions of said guide slot include a first and a second curved portions.

17. The oscillation mechanism of claim 16, wherein said first curved portion of said lower portion curves away from the spool and said second curved portion curves toward the spool.

18. The oscillation mechanism of claim 17, wherein said first curved portion of said upper portion curves toward the spool and said second curved portion curves away from the spool.

19. A method of determining the shape of a curved guide slot of a slider for a fishing reel oscillation mechanism, the oscillation mechanism including an oscillation gear with a guide pin that engages the curved guide slot, comprising the steps of:

selecting a first angle increment and a second angle increment through which the oscillation gear rotates at a constant rate of angular velocity, said first and second angle increments being equal;

determining, for both said first and said second angular increments, a displacement of the slider along a horizontal axis that would be caused by motion of the guide pin within a straight guide slot upon rotation of the oscillation gear, the straight guide slot being transverse to the horizontal axis and symmetric about a vertical center axis of said curved guide slot;

determining a first additional value that when added to said displacement over said first angular increment equals a first total value; and determining a second additional value that when added to said displacement over said second angular increment equals a second total value;

wherein said first total value equals said second total value.

20. The method of claim 19, further comprising using said first and second additional values to determine the shape of said curved guide slot.

21. A method of determining the shape of a curved guide slot of a slider for a fishing reel oscillation mechanism, the oscillation mechanism including an oscillation gear with a guide pin that engages the curved guide slot, comprising the steps of:

selecting a first angle increment and a second angle increment through which the oscillation gear rotates at a constant rate of angular velocity, said first and second angle increments being equal;

determining, for both said first and said second angular increments, a velocity of the slider along a horizontal axis that would be caused by motion of the guide pin within a straight guide slot upon rotation of the oscillation gear, the straight guide slot being transverse to the horizontal axis and symmetric about a vertical center axis of said curved guide slot;

determining a first additional value that when added to said velocity over said first angular increment equals a first total value; and determining a second additional value that when added to said velocity over said second angular increment equals a second total value;

wherein said first total value equals said second total value.

22. The method of claim 21, wherein said first and said second additional values further comprise values of linear acceleration.

* * * * *